United States Patent [19]

Yamada

[11] Patent Number: 5,495,617

[45] Date of Patent: Feb. 27, 1996

[54] ON DEMAND POWERING OF NECESSSARY PORTIONS OF EXECUTION UNIT BY DECODING INSTRUCTION WORD FIELD INDICATIONS WHICH UNIT IS REQUIRED FOR EXECUTION

[75] Inventor: Kouichi Yamada, Tokyo, Japan

[73] Assignee: NEC Corporation, Tokyo, Japan

[21] Appl. No.: 460,745

[22] Filed: Jun. 2, 1995

Related U.S. Application Data

[63] Continuation of Ser. No. 267,553, Jun. 21, 1994, abandoned, which is a continuation of Ser. No. 135,579, Oct. 13, 1993, abandoned, which is a continuation of Ser. No. 845,783, Mar. 6, 1992, abandoned, which is a continuation of Ser. No. 549,622, Jul. 9, 1990, abandoned, which is a continuation of Ser. No. 395,304, Aug. 18, 1989, abandoned, which is a continuation of Ser. No. 253,441, Oct. 6, 1988, abandoned, which is a continuation of Ser. No. 764,576, Aug. 12, 1985, abandoned.

[30] Foreign Application Priority Data

Aug. 10, 1984 [JP] Japan .................. 59-167467

[51] Int. Cl.⁶ .................................. G06F 1/32
[52] U.S. Cl. .................. 395/750; 364/DIG. 2; 364/948.6; 364/948.7
[58] Field of Search .................... 395/375, 750, 395/800

[56] References Cited

U.S. PATENT DOCUMENTS

| | | | |
|---|---|---|---|
| 3,736,569 | 5/1973 | Bouricius et al. | 364/200 |
| 3,764,988 | 10/1973 | Onishi | 364/200 |
| 3,941,989 | 2/1976 | McLaughlin et al. | 364/200 |
| 4,004,283 | 1/1977 | Bennett et al. | 364/200 |
| 4,010,448 | 3/1977 | Bennett et al. | 364/200 |
| 4,107,785 | 8/1978 | Seipp | 364/900 |
| 4,137,563 | 1/1979 | Tsunoda | 364/200 |
| 4,293,927 | 10/1981 | Hoshii | 364/900 |
| 4,316,247 | 2/1982 | Iwamoto | 364/200 |
| 4,317,180 | 2/1982 | Lies | 364/707 |
| 4,317,181 | 2/1982 | Teza et al. | 364/707 |
| 4,349,873 | 9/1982 | Gunter et al. | 364/200 |
| 4,370,709 | 1/1983 | Fosdick | 364/200 |
| 4,381,552 | 4/1983 | Nocilini et al. | 364/900 |
| 4,409,665 | 10/1983 | Tubbs | 364/707 |
| 4,450,524 | 5/1984 | Oberman | 364/200 |
| 4,459,666 | 7/1984 | Kruger | 395/425 |
| 4,463,440 | 7/1984 | Nishiura et al. | 364/900 |
| 4,479,191 | 10/1984 | Nojima et al. | 364/707 |
| 4,570,219 | 2/1986 | Shibukawa et al. | 364/200 |
| 4,573,117 | 2/1986 | Boney | 364/200 |
| 4,590,553 | 5/1986 | Noda | 364/200 |
| 4,615,005 | 9/1986 | Maejima et al. | 364/200 |
| 4,638,300 | 1/1987 | Miller | 364/784 X |
| 4,670,837 | 6/1987 | Sheets | 364/200 |
| 4,716,521 | 12/1987 | Nagae | 364/200 |
| 4,901,235 | 2/1990 | Vora et al. | 395/375 |

FOREIGN PATENT DOCUMENTS

| | | |
|---|---|---|
| 2825770 | 1/1980 | Germany . |
| 57-43238 | 3/1982 | Japan . |
| 2130405 | 5/1984 | United Kingdom . |

OTHER PUBLICATIONS

Smith et al., "C-MOS Microprocessor Wakes Itself Up", Electronics, Sep. 25, 1980, pp. 123–126.

*Primary Examiner*—Parshotam S. Lall
*Assistant Examiner*—Richard L. Ellis
*Attorney, Agent, or Firm*—Foley & Lardner

[57] ABSTRACT

A microprocessor of CMOS structure includes at least an execution unit and a control unit including an instruction register adapted to receive and store instructions to be executed by the microprocessor and an instruction decoder receiving the instruction from the instruction register and outputting a control signal. Furthermore, the processor comprises a second instruction decoder receiving at least a portion of the instruction applied from the instruction register to the first instruction decoder so as to supply a standby control signal to the execution unit.

11 Claims, 8 Drawing Sheets

| 0 | 1 | 2 | 3 | 4 | 5 | 6 | 7 | OTHER FIELD | N |
|---|---|---|---|---|---|---|---|---|---|
| 0 | 0 | 0 | 1 | 1 | 0 | 1 | 1 | | |

FIGURE 7(a)

| 0 | 1 | 2 | 3 | 4 | 5 | 6 | 7 | OTHER FIELD | N |
|---|---|---|---|---|---|---|---|---|---|
| 0 | 0 | 0 | 1 | 1 | 0 | 0 | 0 | | |

FIGURE 7(b)

| 0 | 1 | 2 | 3 | 4 | 5 | 6 | 7 | OTHER FIELD | N |
|---|---|---|---|---|---|---|---|---|---|
| 1 | 0 | 0 | 0 | 0 | X | X | X | | |

ON DEMAND POWERING OF NECESSSARY PORTIONS OF EXECUTION UNIT BY DECODING INSTRUCTION WORD FIELD INDICATIONS WHICH UNIT IS REQUIRED FOR EXECUTION

This application is a continuation of application Ser. No. 08/267,553, filed Jun. 21, 1994, now abandoned; which is a continuation of application Ser. No. 08/135,579, filed Oct. 13, 1993, now abandoned; which is a continuation of application Ser. No. 07/845,783, filed Mar. 6, 1992, now abandoned; which is a continuation of application Ser. No. 07/549,622, filed Jul. 9, 1990, now abandoned; which is a continuation of application Ser. No. 07/395,304, filed Aug. 18, 1989, now abandoned; which is a continuation of application Ser. No. 07/253,441, filed Oct. 6, 1988, now abandoned; which is a continuation of application Ser. No. 06/764,576, filed Aug. 12, 1985, now abandoned.

BACKGROUND OF THE INVENTION

1. Field of the Invention

The present invention relates to microprocessors, and more particularly to microprocessors of CMOS structure having at least an execution unit and a control unit.

2. Description of Related Art

At present, there have been developed a variety of microprocessors constituted of complementary MOS (CMOS) integrated circuits in order to decrease consumption of power. Such microprocessors ordinarily have a so-called "standby" mode in which the microprocessor stands by in a ready condition capable of immediately restarting its operation whenever an restart instruction is received.

This standby mode is divided into a stop mode and a halt mode. In the stop mode, not only the execution of instructions is stopped but also the generation of clocks is stopped so as to minimize the power consumption of the processor. But, the content of data memories is held as it is so that when the processor is released from the stop mode the processor can restart to execute the instructions in the same condition as that just before the processor is brought into the stop mode. In addition, the function necessary for terminating the stop mode is maintained effective. In the halt mode, on the other hand, the clock generation is maintained but all functions excluding the function for interrupt are stopped. Ordinarily, when the processor has completed the execution of one program, it is put into the halt mode by the halt instruction generated in the processor itself. In any case, with a reset input or an interrupt request to the processor, the stop mode and the halt mode are terminated and the processor restarts its execution of instructions.

Figure 1:
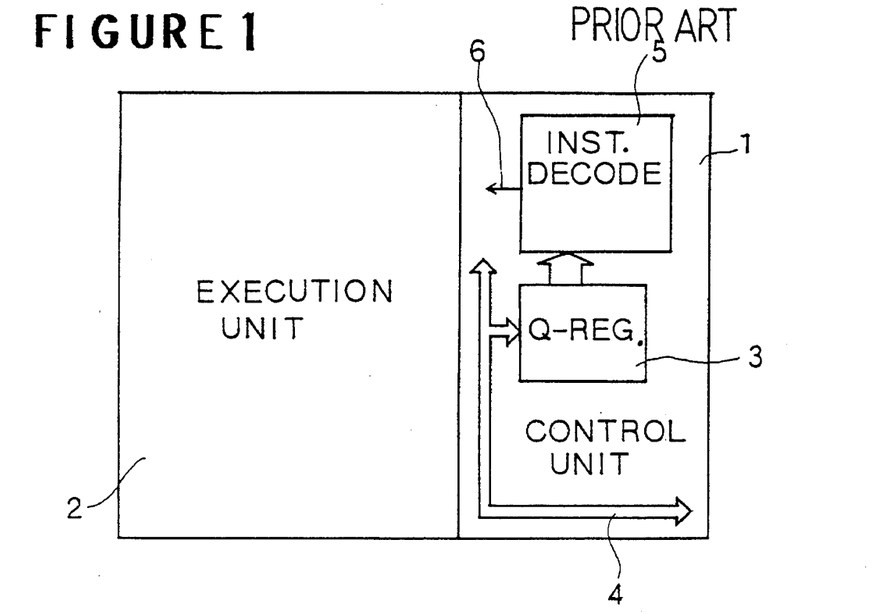
FIG. 1 is a block diagram showing a conceptual structure of the conventional microprocessor.

Briefly, the conventional microprocessor ordinarily comprises a control unit 1 and an execution unit 2, as shown in FIG. 1. The control unit 1 includes an instruction register or queue register 3 coupled to an internal bus 4, and an instruction decoder 5 coupled to the queue register 3 and adapted to output decoded control signals 6 to the execution unit 2. On the other hand, the execution unit 2 mainly comprises an arithmetic logic unit, an accumulator, a temporary register and others (not shown) as well-known to persons skilled in the art. If the microprocessor as mentioned above is combined with a read only memory, a random access memory and an input/output device, a microcomputer can be constituted.

As seen from FIG. 1, in the conventional microprocessor, the execution unit 2 is controlled as a whole by the instruction decoder 5, and therefore, is put in the standby mode fundamentally in accordance with the instructions.

Figure 2:
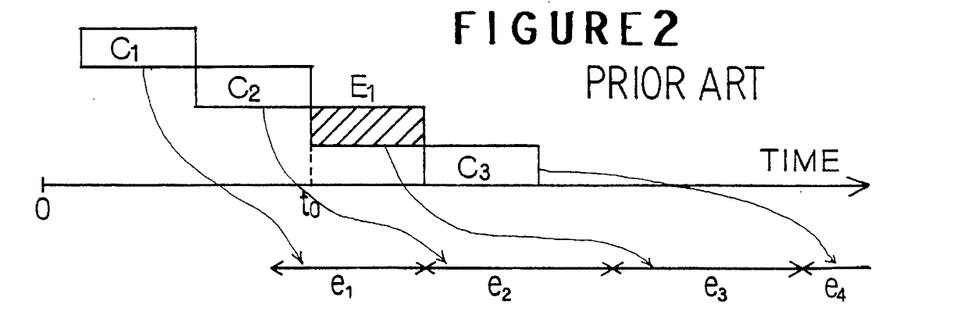
FIGS. 2 and 3 are time charts showing a stream of instructions for the microprocessor shown in FIG. 1.

Therefore, assuming that the aforementioned microprocessor is applied with a sequence of instructions $C_1$, $C_2$, $E_1$ and $C_3$ (where $C_1$, $C_2$ and $C_3$ are control instructions and $E_1$ is an operation instruction) as shown in FIG. 2, these instructions are sequentially executed for execution periods $e_1$, $e_2$, $e_3$ and $e_4$, respectively, and during the four periods, the execution unit 2 is maintained in operating condition, not in the standby mode. Therefore, a substantial amount of power will be consumed in the execution unit.

Figure 3:
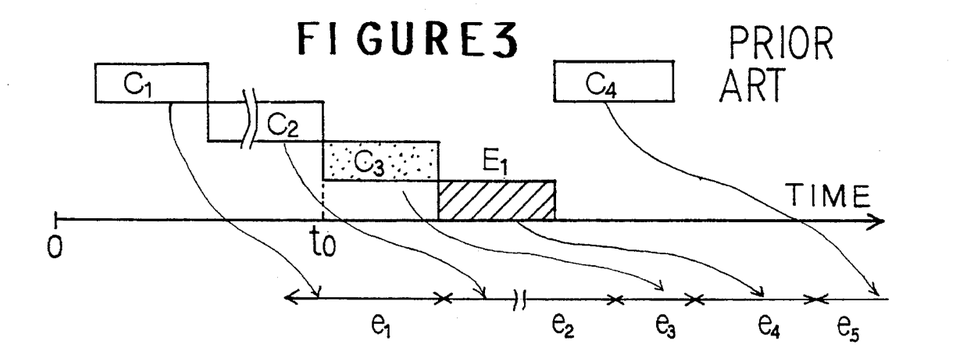

Turning to FIG. 3, there is shown a time chart of a program sequence for cancellation of the standby mode. In the example of FIG. 3, control instructions $C_1$, $C_2$ and $C_3$ (where $C_3$ is an interrupt instruction), an operation instruction $E_1$ and a control instruction $C_4$ are executed in the mentioned order for execution periods $e_1$, $e_2$, $e_3$, $e_4$ and $e_5$. Therefore, in order to release the processor from the standby mode so that the processor can execute the operation instructions, it has been necessary to supply the interrupt instruction $C_3$ before the operation instruction $E_1$.

As seen from the above, the conventional microprocessor is ordinarily in a condition requiring a substantial consumption of power irrespective of whether the control instruction or the operation instruction is executed, and also, the interrupt instruction is necessary for release of the processor from the standby mode once the processor has entered the standby mode.

Particularly, the microprocessor of an ordinary scale needs an operating current of about ten and several milliamperes in an operating condition, but consumes only ten and several microamperes in the standby condition. This difference in current consumption between the operating condition and the standby condition has been recently further enlarged because the execution unit may be greatly larger than the control unit. At present, large-scaled microprocessors need an operating current of one hundred and several tens milliamperes and a power consumption of several hundreds milliwatts in the operating condition. In such microprocessors, the average power dissipation in large even in the standby mode, and therefore, the low power consumption effect which is the most attractive feature of the CMOS structure is less important, even if the power consumption itself is greatly smaller as compared with the processor of an NMOS structure having the same processing capability.

In order to further enhance the low power consumption of the CMOS structure, it is considered to construct all the CMOS circuits in the form of static circuits, so that essentially no current flows unless there is a change of data. However, it is difficult to construct the circuit by using only static circuits. This is true because a static circuit requires a larger number of transistors than that of a dynamic circuit having the same function, and microprocessors often have to include a number of dynamic circuits in order to be able to fit on the restricted area of an integrated circuit chip.

SUMMARY OF THE INVENTION

Accordingly, it is one object of the present invention to provide a microprocessor free from the aforementioned drawbacks of the conventional microprocessor.

Another object of the present invention is to provide a relatively large-scaled microprocessor of CMOS structure having a relatively small average power dissipation.

Still another object of the present invention is to provide a microprocessor of CMOS structure having a small power consumption when a stream of normal instructions are executed.

A further object of the present invention is to provide a microprocessor of CMOS structure having an execution unit which is put in a standby mode when control instructions are executed in a stream of ordinary instructions.

A still further object of the present invention is to provide a microprocessor of CMOS structure in which a portion of an execution unit is selectively put into a standby mode when a stream of ordinary instructions are executed.

The above and other objects of the present invention are accomplished in accordance with the present invention by a microprocessor of CMOS structure which includes at least an execution unit and a control unit including an instruction register adapted to receive and store instructions to be executed by the microprocessor and an instruction decoder receiving the instruction from the instruction register and outputting control signals, wherein the improvement comprises a second instruction decoder receiving at least a portion of the instruction applied from the instruction register to the first instruction decoder so as to supply a standby control signal to the execution unit.

With the above arrangement, since the second instruction decoder receives a portion of the instruction from the instruction register to the first instruction decoder, the second instruction decoder can discriminate whether or not the instruction to be executed is an operation instruction or a control instruction, and generates the standby control signal when the instruction to be executed is an execution instruction. Therefore, the execution unit can cause entry into the standby mode after the operation mode is completed, and then affects return to the operation mode when the standby control signal is applied. Accordingly, the execution unit is put in the standby condition more frequently as compared with the conventional CMOS microprocessor, and so, the average power dissipation becomes greatly smaller than that of the conventional CMOS microprocessor. This effect will be enhanced as the execution unit becomes larger.

Preferably, the execution unit is adapted to enter the standby mode without receiving a specific instruction such as a halt instruction and a stop instruction in the course of a stream of instructions. In this case, since the execution unit can come back to the operation mode without receiving an interrupt instruction for cancellation of the standby condition as mentioned above, the execution unit can enter the standby mode and return to the normal operation mode without requiring any instruction in streams of instructions, and therefore, the speed of processing becomes relatively higher than the conventional microprocessor.

In an embodiment of the microprocessor in accordance with the present invention, the execution unit is adapted to put only a portion of the execution unit in the standby mode, and to return that portion to the operation mode in response to the standby control signal. Specifically, the portion of the execution unit put in the standby mode is a microprogram ROM read-out circuit, or a carry lookahead circuit in an arithmetic logic circuit of the execution unit.

Further, in a preferred embodiment, the microprocessor is a coprocessor. In this case, the instruction loaded to the first instruction decoder includes the most significant plural bits which indicates whether a given instruction is directed to the coprocessor and the next least significant plural bits which designates whether the given instruction needs microprogram decoding, and the second instruction decoder includes a first NOR gate receiving the above most significant plural bits, a second NOR gate receiving the above next least significant plural bits and an AND circuit receiving the outputs of the first and second NOR gates for generating the standby cancel signal.

In addition, there is provided a microprogram ROM read controller adapted to detect an END microinstruction by detecting the most significant plural bits of microinstructions and to generate a halt signal, and the execution unit is adapted to be put into the standby mode in response to the halt signal. Specifically, the processor further includes a microprogram ROM read-out circuit which is associated to a microprogram ROM and adapted to be rendered operable in response to the standby cancel signal and non-operable in response to the halt signal. Otherwise, the microprocessor further includes a carry lookahead circuit in the execution unit and a carry lookahead biasing circuit which is associated with the carry lookahead circuit and adapted to supply a bias voltage to the carry lookahead circuit in response to the standby cancel signal and to make it non-operable in response to the halt signal.

The above and other objects, features and advantages of the present invention will be apparent from the following description of preferred embodiments of the invention with reference to the accompanying drawings.

BRIEF DESCRIPTION OF THE DRAWINGS

FIGS. 7a–7c are diagrams showing three examples of instruction format in which

DESCRIPTION OF THE PREFERRED EMBODIMENTS

Figure 4:
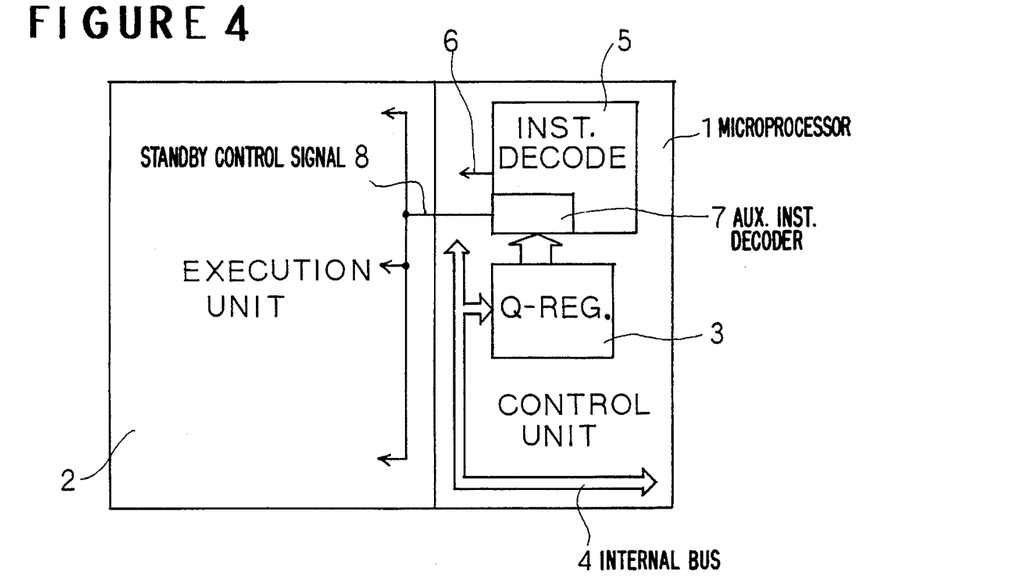
FIG. 4 is a diagram similar to FIG. 1, but showing one embodiment of the microprocessor in accordance with the present invention.

Referring to FIG. 4, there is shown a conceptual structure of the microprocessor in accordance with the present invention, which comprises a control unit 1 and an execution 2. The control unit 1 includes a queue register 3 coupled to an internal bus 4 and having final stages functioning as an instruction register, and an instruction decoder 5 coupled to the instruction register 3 to generate decoded control signals 6. In addition, the control unit 1 ordinarily comprises a program counter (not shown), and may further include additional registers such as index registers, arithmetic units to provide address modifications, and other functional units (all of which are also not shown). On the other hand, the execution unit 2 comprises an arithmetic logic unit, an accumulator, a temporary register, a read controller for a microprogram read only memory (ROM), a microprogram ROM address register, and other functional units (all of which are not shown in FIG. 4) as well-known to persons skilled in the art.

In such an arrangement and in accordance with the present invention, the instruction decoder 5 is associated with an auxiliary instruction decoder 7 which receives at least a portion of the instruction applied to the instruction decoder 5 and generates a standby control signal 8 indicating whether that instruction is an operation instruction. For example, when the standby control signal 8 is at a logical level "1", it means that the instruction to be executed is an operation instruction, and on the other hand, when the standby control signal is at a logical level "0", it means that the instruction to be executed is a control instruction.

Figure 5:
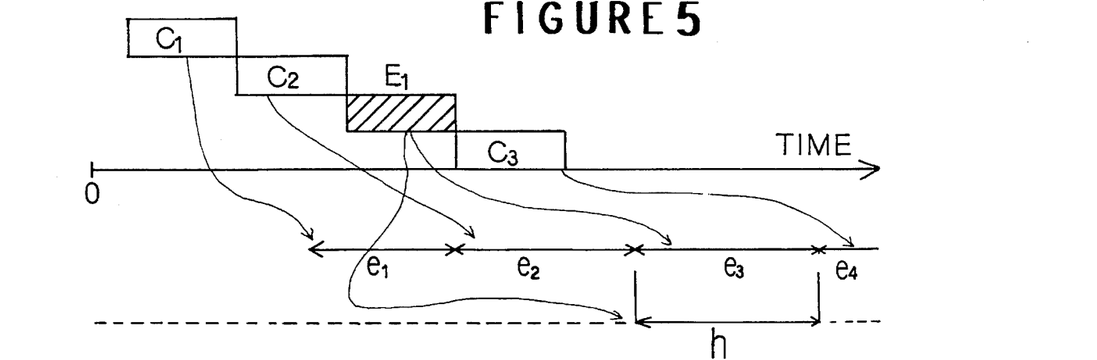
FIGS. 5 and 6 are charts similar to FIG. 2, but showing a stream of instructions for the microprocessor shown in FIG. 4.

Turning to FIGS. 5 and 6, there are shown two examples of instruction sequences applied to the microprocessor of FIG. 4 and the sequences of execution times for such sequences of instructions. As shown in FIG. 5, in the case that the sequence of instructions is composed of control instructions $C_1$ and $C_2$, an operation instruction $E_1$ and a control instruction $C_3$, these instructions are sequentially executed for execution periods $e_1$, $e_2$, $e_3$ and $e_4$. But, in the course of such instruction executions, when the control instructions $C_1$ and $C_2$ are applied to the instruction decoder 5, the auxiliary instruction decoder 7 generates and supplies the standby control signal 8 of logical level "0" to the execution unit 2, so that the execution unit 2 is in the standby mode during the execution periods $e_1$ and $e_2$. Thereafter, when the execution instruction $E_1$ is applied to the instruction decoder 5, the auxiliary instruction decoder 7 supplies the standby control signal 8 of the logical level "1" to the execution unit 2. As a result, the execution unit 2 is released from the standby mode, and the operation instruction $E_1$ is executed for the period $e_3$. After the execution of the instruction $E_1$, the execution unit 2 is returned to the standby mode since the next instruction is the control instruction $C_3$.

Figure 6:
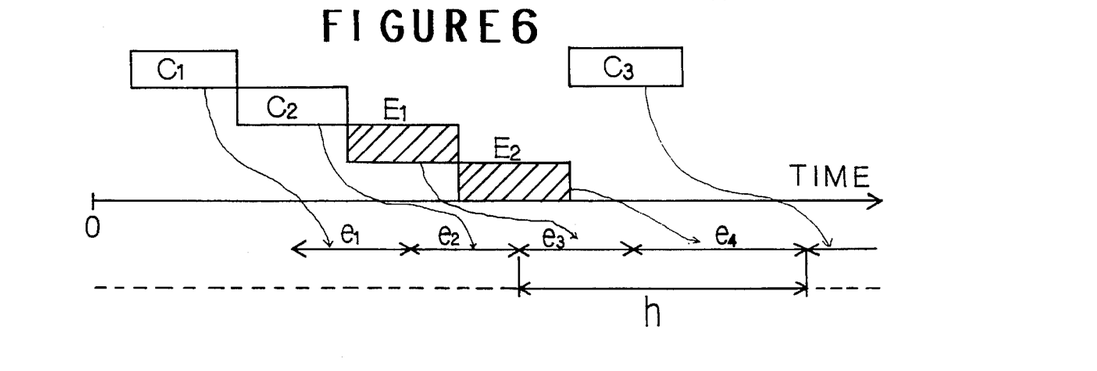

In the case of the instruction sequence as shown in FIG. 6, when the control instructions $C_1$ and $C_2$ are applied to the instruction decoder 5, the auxiliary instruction decoder 7 generates and supplies the standby control signal 8 of logical level "0" to the execution unit 2, so that the execution unit 2 is in the standby mode during the execution periods $e_1$ and $e_2$. Thereafter when the execution instruction $E_1$ is applied to the instruction decoder 5, the auxiliary instruction decoder 7 supplies the standby control signal 8 of the logical level "1" to the execution unit 2. As a result, the execution unit 2 is released from the standby mode, and the operation instruction $E_1$ is executed for the period $e_3$.

This instruction $E_1$ is followed by another operation instruction $E_2$, so that the auxiliary instruction decoder again outputs the standby control signal of the logical level "1" when the instruction $E_2$ is applied to the instruction register 5. Accordingly, the execution unit 2 is maintained in the operation mode, and the operation instruction $E_2$ is executed for the period $e_4$. Thereafter, when the next instruction, i.e., the control instruction $C_3$ is loaded to the instruction decoder 5, the auxiliary instruction decoder 7 generates the standby control signal of the logical level "0", and so the execution unit 2 is returned to the standby mode.

As seen from the above, in the course of execution of the ordinary instruction stream, the execution unit 2 is normally put in the standby mode as shown in dotted lines in FIGS. 5 and 6, and is brought into the operation mode as shown in the solid line labeled "h" in FIGS. 5 and 6 when the operation instruction should be executed.

Therefore, the execution unit is more frequently put in the standby mode in the course of execution of the ordinary instruction stream without receiving a halt instruction or a stop instruction, and thus, the average power consumption of the microprocessor becomes greatly small. In addition, since the execution unit can be placed in either the standby mode or the operation mode without receiving any specific instruction such as a halt instruction, a stop instruction and an interrupt instruction in the instruction streams, the processing speed greatly increased.

The aforementioned microprocessor is more effective in the case wherein it is applied to a so-called coprocessor, because it is ordinarily smaller in the number of operation instructions than a master processor associated with the coprocessor, or a single processor without any coprocessor. In addition, it is more practical to automatically a portion of the execution unit in the standby mode at completion of execution of each microprogram, as compared with placing the execution unit in the standby mode in response to the standby control signal of logical level "0". Therefore, explanation will be made on one example of the coprocessor embodying the present invention.

Figure 7A:
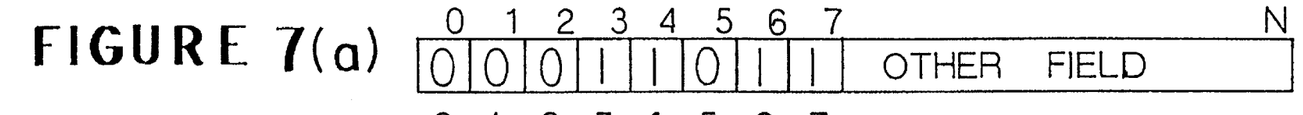
FIG. 7a is a coprocessor instruction requiring a microprogram read.
Figure 7B:
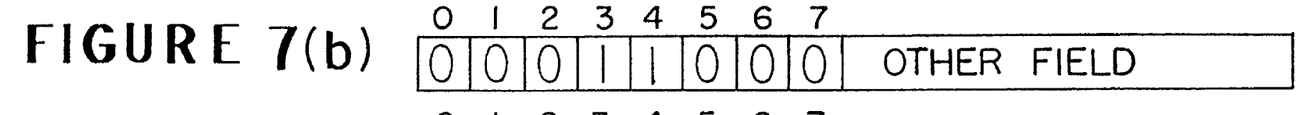
FIG. 7b is a coprocessor instruction which does not require a microprogram read.
Figure 7C:
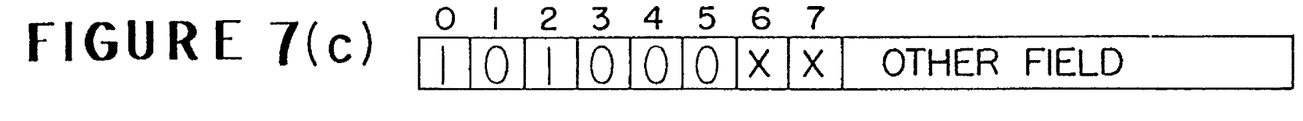
FIG. 7c is a master processor instruction.

Referring to FIGS. 7a–7c, there is shown three examples of the instruction format applied to a multiprocessor which includes at least two microprocessors adapted to be divided into a host processor and a coprocessor in the case of execution of high speed floating-point arithmetic processing and other high speed processings. In FIGS. 7a–7c, the instruction words includes N bits, the most significant six bits 0 to 5 of which includes a processor indication instruction, and the next most significant two bits 6 and 7 shows whether the instruction requires reading of a microprogram ROM associated to the coprocessor in the case that the first to sixth bits designates the coprocessor.

For example, as shown in FIGS. 7 (a) and 7 (b), if the first to sixth bits are "000110", the instruction is for the coprocessor, and if the first to sixth bits bear data other than "000110", for example "101000" as shown in FIG. 7 (c), the instruction is for the master processor. In addition, when "11" appears in the seventh and eighth bits as shown in FIG. 7 (a), it means that the coprocessor instruction in the first to sixth bits needs to read the microprogram from the microprogram ROM. Such a read operation ordinarily requires use of the execution unit. If the seventh and eighth bits are "00" as shown in FIG. 7 (b), the coprocessor instruction does not need the reading of the microprogram ROM. Namely, the "00" indicates a non-memory reference instruction.

Figures 8, 8A:
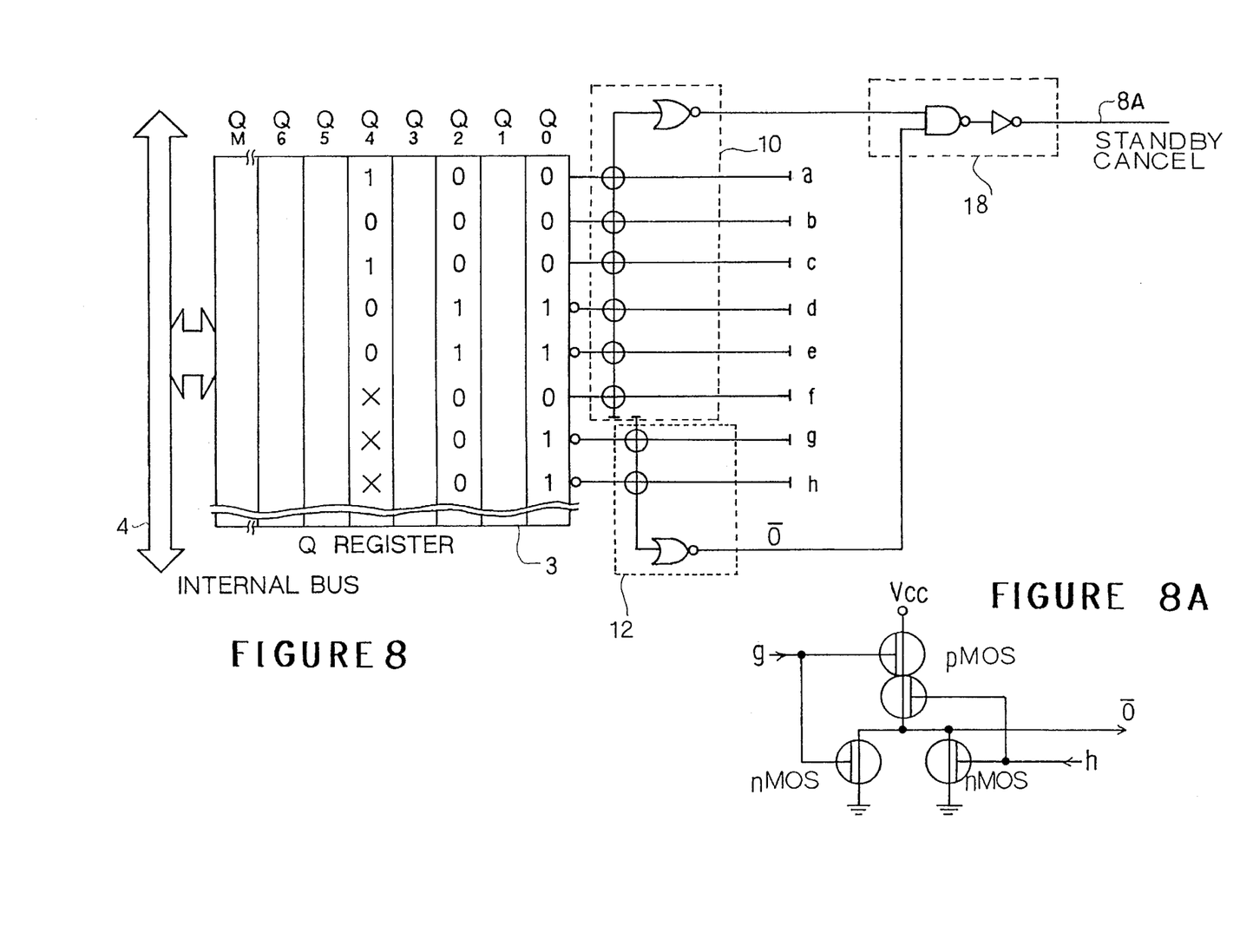
FIG. 8 is a logic circuit diagram of one example of a microprogram ROM read instruction detecting circuit which can used as the auxiliary instruction decoder in the control unit of the microprocessor.
FIG. 8A is a circuit diagram of a transistor circuit for the microprogram ROM read instruction detecting circuit shown in FIG. 8.

Now, assuming that the instructions of the aforementioned format are supplied to the queue register 3 of the control unit 2 in the coprocessor, the auxiliary instruction decoder 7 can be constructed as shown in FIG. 8. The queue register 3 comprises a plurality of (M+1)-stage shift registers of the number corresponding to the word length of the instruction, and the initial stages of these shift registers are coupled to the internal bus 4 to receive the instructions to be executed. But, for simplification of drawing, there is shown only eight shift registers for the most significant 8 bits of the instructions. The last stages of the most significant 8 bit portion of the queue register 3 are connected to a coprocessor instruction detector 10 and a microprogram ROM detector 12.

Specifically, the decoder 10 is constructed of for example a NOR circuit having six inputs connected to the outputs of the first to sixth shift registers corresponding to the most significant 6 bits of the instructions. Particularly, the fourth and fifth shift registers supply their outputs "d" and "e" in the invented form to the NOR circuit, and the first, second, third and sixth shift registers supply non-inverted outputs "a", "b", "c" and "f" to the NOR circuit.

On the other hand, the microprogram ROM detector 12 includes a two-input NOR circuit having inputs connected to inverted outputs "g" and "h" of the seventh and eight shift registers. This NOR circuit can be formed by for example a CMOS circuit as shown in FIG. 8A, which includes two CMOS inverters interconnected in such a manner that each pMOS device is series-connected to each other and each nMOS device is put in parallel to each other. The outputs of these NOR circuits are connected to a two-input AND circuit 18, which outputs a STANDBY CANCEL signal 8A.

Figure 9:
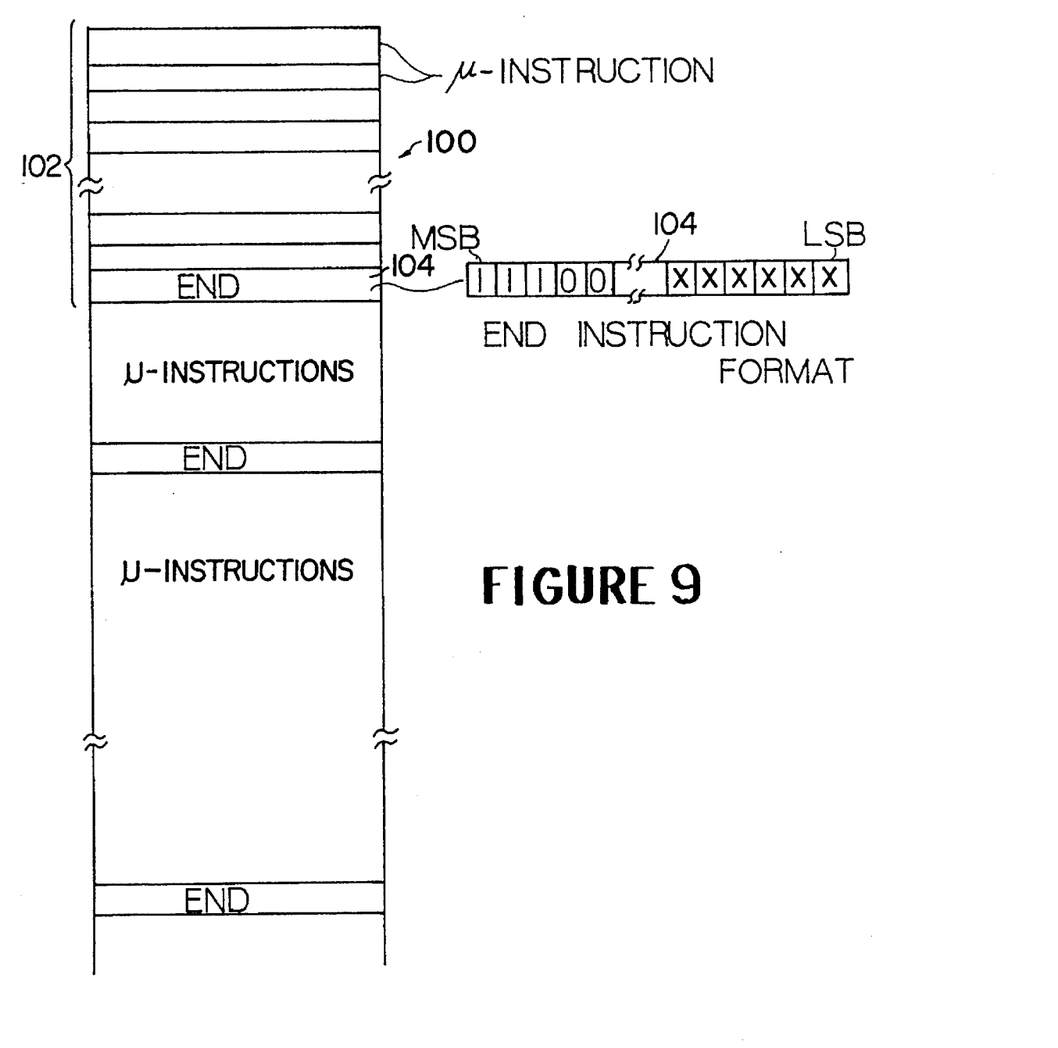
FIG. 9 is a chart showing one example of microinstruction streams which constitute microprograms.

Turning to FIG. 9, there is shown one example of a microinstruction streams supplied to a microinstruction bus. As seen from FIG. 9, each set of microinstructions which constitute one microprogram 102 is terminated with an END microinstruction 104, which includes for example "11100" in the most significant five bits as shown in FIG. 9. Therefore, such an END micro instruction is detected by an end instruction detector generally indicated by reference number 20 in FIG. 10.

Figure 10:
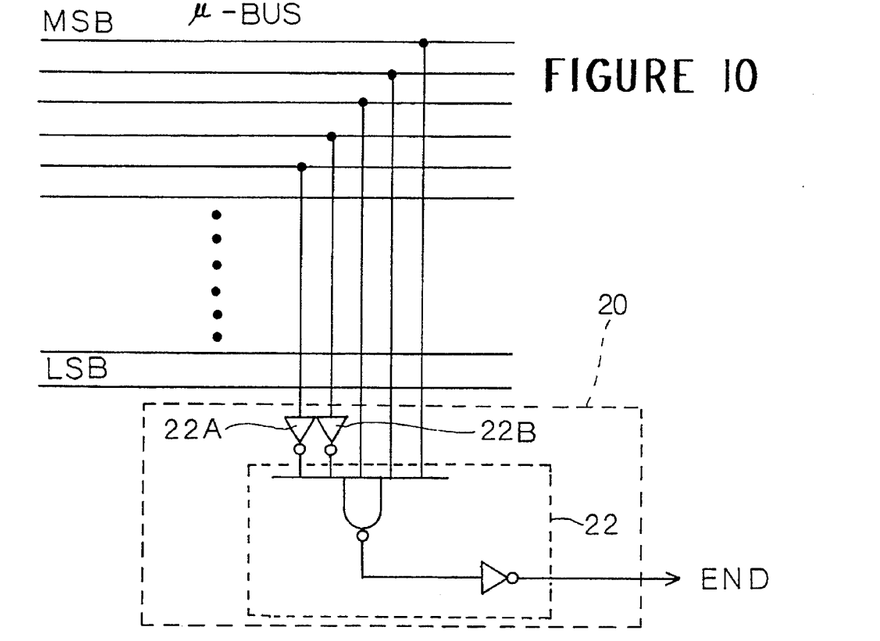
FIG. 10 is a logic circuit diagram of one example of an END instruction detector.

The detector 20 comprises a five-input AND circuit 22, three inputs of which are connected to the most significant three bit lines of the microinstruction bus, and the other two inputs are connected through inverters 22A and 22B to the next least significant two bit lines of the microinstruction bus. Therefore, when the most significant five bits of the microinstruction bus are "11100", the END instruction detector 20 outputs an END signal of the logical level "1".

Figure 11:
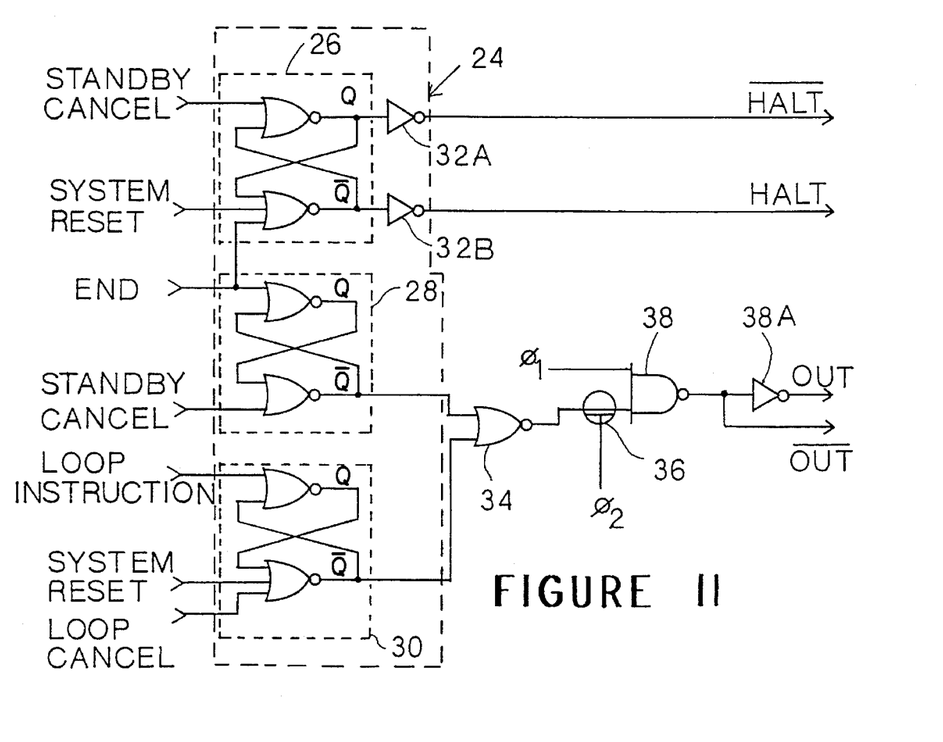
FIG. 11 is a logic circuit diagram of one example of a microprogram ROM read controller.

This END signal is applied as one kind of standby signal to a microprogram ROM read controller generally indicated by reference number 24 in FIG. 11. This controller 24 includes three RS flipflops 26, 28 and 30 each of which is formed of two NOR gates. The first flipflop 26 receives at its S input the STANDBY CANCEL signal 8A from the circuit 18 and at its two R inputs the END signal from the END instruction detector 20 and a SYSTEM RESET signal which also functions as one kind of standby signal. The flipflop 26 is connected at its Q output to an inverter 32A, which in turn generates a halt cancel signal $\overline{HALT}$. The $\overline{Q}$ output of the flipflop 26 is connected to another inverter 32B for generating a halt signal HALT.

Further, the END signal and the STANDBY CANCEL signal are respectively applied to R and S inputs of the second flipflop 28, whose Q output is connected to one input of a NOR gate 34. In addition, a LOOP INSTRUCTION signal, the SYSTEM RESET signal and a LOOP CANCEL signal are supplied to an R input and two S inputs of the third flipflop 30. This flipflop 30 is connected at its $\overline{Q}$ output to another input of the NOR gate 34, whose output is connected through a MOS transistor 36 to one input of a NAND gate 38. Clocks $\varnothing_1$ and $\varnothing_2$ are applied to another input of the NAND gate 38 and the gate of the transistor 36. Thus, NAND gate 38 generates an OUT signal and outputs an $\overline{OUT}$ signal and through an inverter 38A an OUT signal.

Figure 12:
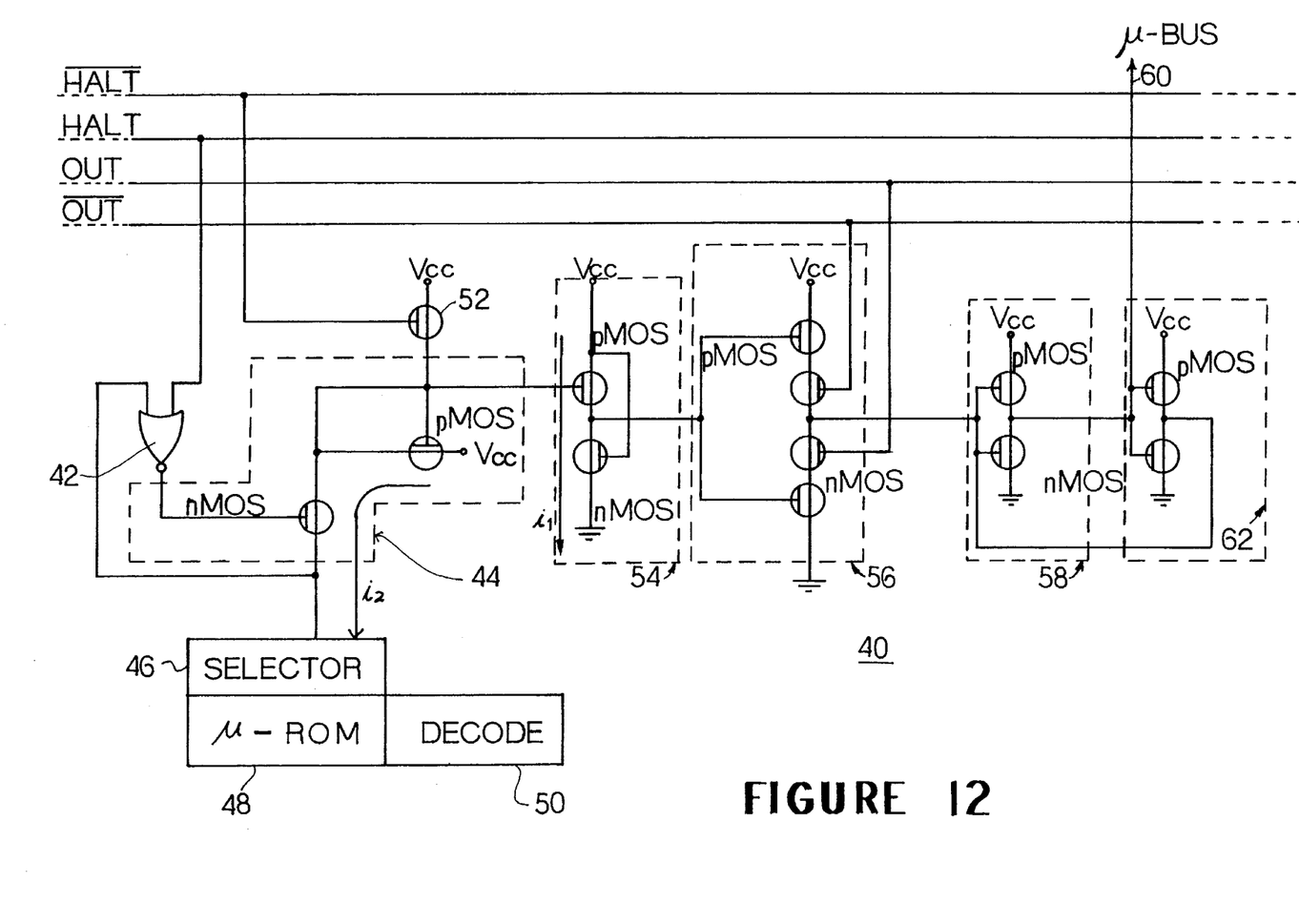
FIG. 12 is a circuit diagram of a sense amplifier in accordance with the present invention for the microprogram ROM reading circuit.

The signals, HALT, $\overline{HALT}$, OUT and $\overline{OUT}$ thus generated are applied to, for example, a sense amplifier 40 as shown in FIG. 12, which constitutes a microprogram ROM read-out circuit. The circuit shown is for one bit, and therefore, if the microinstructions in the microprogram ROM have the length of 20 bits at maximum, a total of twenty similar circuits are required.

The sense amplifier 40 comprises a NOR gate 42 connected at its one input to the HALT signal line, and at its output to the gate of nMOS device of a CMOS circuit 44, which circuit is connected between $V_{CC}$ and a selector 46 for a microprogram ROM 48 associated with a decoder 50. The nMOS device has a source connected to another input of the NOR gate 42. The $\overline{HALT}$ line is connected to a gate of an MOS device 52 connected between $V_{CC}$ and the common-connected gate and drain of the pMOS device of the CMOS circuit 44. The gate of the pMOS device of the CMOS circuit 44 is further connected to the gate of the pMOS device of a second CMOS circuit 54 in which the gate of the nMOS device is connected to the source of the pMOS device.

The connection node between the pMOS and nMOS devices of the CMOS circuit 54 is connected to the gates of the outside pMOS and nMOS devices of a cascaded double-stage CMOS circuit 56. The inside pMOS and nMOS devices are connected at their gates to the OUT and $\overline{OUT}$ lines, respectively. The connection point between the pMOS and nMOS devices of the circuit 56 is connected to the gates of a fourth CMOS circuit 58. The intermediate connection between the pMOS and nMOS devices of the CMOS circuit 58 is connected to one line 60 of a microinstruction bus and the gates of a fifth CMOS circuit 62, whose intermediate connection point is connected to the gates of the CMOS circuit 58. The CMOS circuits 54, 56, 58 and 62 are connected between $V_{CC}$ and ground.

With this arrangement, when the $\overline{HALT}$ and OUT signals are "1" and the HALT and $\overline{OUT}$ signals are "0", currents $i_1$ and $i_2$ flow through the CMOS circuits 44 and 54, and so, a predetermined memory cell in the microprogram ROM 48 is read out to the bus line 60. But, if the $\overline{HALT}$ and HALT signals are brought into "0" and "1", respectively, the currents $i_1$ and $i_2$ are stopped. Therefore, in the case of the microprogram ROM of 20-bit words, the total current $20(i_1+i_2)$ is saved.

Figures 13, 13A:
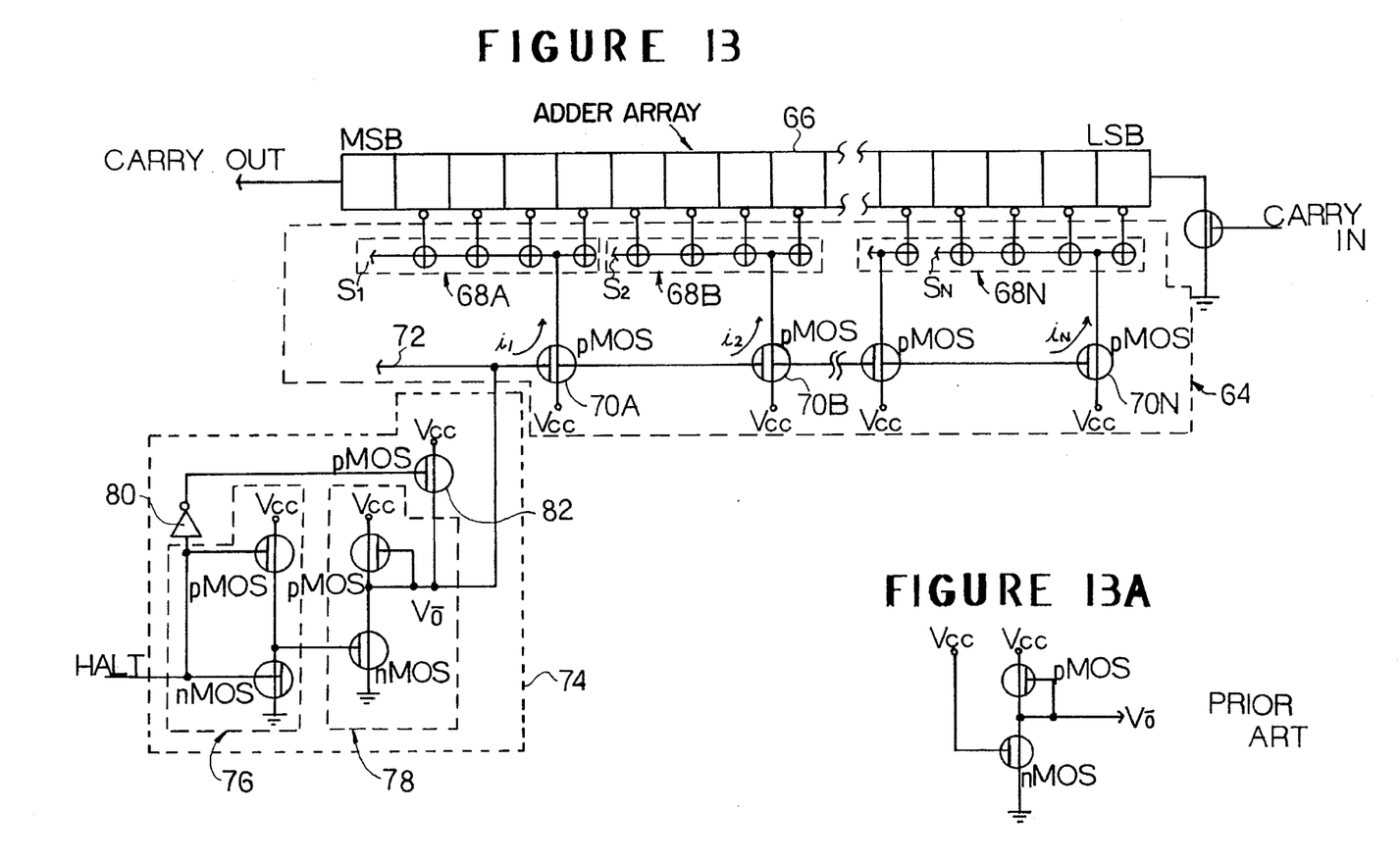
FIG. 13 is a circuit diagram of a carry lookahead circuit in accordance with the present invention.
FIG. 13A is a circuit diagram of a biasing circuit for the conventional carry lookahead circuit.

Furthermore, the HALT signal generated by the microprogram ROM read-out controller 24 in FIG. 11 can be applied to a carry lookahead circuit 64 for an adder circuit incorporated in the arithmetic logic circuit, as shown in FIG. 13 in a very simplified and partially omitted form. The carry lookahead circuit 64 is associated to an adder array 66 which receives at the least significant bit adder a carry-in signal and outputs from the most significant bit adder a carry-out signal. This adder array 66 is divided into a plurality of groups each of which consists of adders for four continuous bits. The adders of each group have an inverted output connected to a four input NOR gate 68A, 68B, . . . 68N, which have one pMOS device 70A, 70B . . . 70N at their current supply ports, respectively. All the gates of these pMOS devices 70A to 70N are connected to a common line 72, a potential $\overline{V_0}$ of which is controlled by an associated current controller 74.

With the above arrangement, if the potential $\overline{V_0}$ of the common line 72 is at a low level, all the pMOS devices 70A to 70N are conductive, and therefore, the NOR gates 68A to 68N are operable. In such a condition, if all the sum outputs of a given adder group for four bits are "1", the associated NOR gate $68i$, i=1 to N, generates a carry signal $S_i$, i=1 to N, of logical level "1". At this time, if there is a carry "1" from the adder group (i+1) for the next least significant four bits, a carry propagate signal "1" is generated by a circuit not shown, and then applied to the adder group (i−1) for the next significant four bits. As a result, the carry signal runs to the more significant adder by bypassing the given adder group for four bits so that the propagation speed of the carry is greatly increased.

The controller 74 includes a CMOS circuit 76 adapted to receive the HALT signal at its gate input. The output of the CMOS circuit 76 is connected to the gate of the nMOS device of another CMOS circuit 78, whose output is connected to the gate of the pMOS device of the CMOS circuit 78 per se and also to the common line 72. The HALT signal is also applied to an inverter 80 whose output is connected to the gate of a pMOS device 82 between $V_{CC}$ and the output of the CMOS circuit 78. The two CMOS circuits 76 and 78 are connected between $V_{CC}$ and ground.

With the arrangement, if the HALT signal is of "1", the CMOS circuit 76 and the pMOS device 82 are conductive, and the CMOS circuit 78 is non-conductive, so that the common line 72 is maintained at a high level so as to render all the pMOS devices 70A to 70N non-conductive. Thus, currents $i_1, i_2 \ldots i_n$ are prevented from flowing through these pMOS devices 70A to 70N. In the prior art, the current controller 78 was constructed as shown in FIG. 13A, and so, the currents $i_1, i_2 \ldots i_n$ always flows through the pMOS devices 70A to 70N.

The invention has thus been shown and described with reference to specific embodiments. However, it should be noted that the invention is in no way limited to the details of the illustrated structures but changes and modifications may be made within the scope of the appended claims.

I claim:

1. A microprocessor of CMOS structure comprising:

(a) an execution unit, (b) a control unit including:

a bus, an instruction register coupled to said bus to receive and store instructions to be executed by the microprocessor, a first instruction decoder coupled to said instruction register for receiving an instruction from the instruction register and for outputting at least one control signal to the execution unit, a second instruction decoder connected to said instruction register to receive at least a portion of said instruction for generating a standby cancel signal to the execution unit for placing said execution unit in an operational mode, (c) said execution unit responsive to said at least one control signal and including:

a microinstruction bus, and a microprogram ROM read controller coupled to receive said standby cancel signal from the second instruction decoder and also coupled to said microinstruction bus to detect an END microinstruction for generating a halt signal in response thereto, said halt signal being supplied to said execution unit, (d) wherein said execution unit is placed into a standby mode in response to said halt signal, said execution unit normally being placed in said standby condition so that average power consumption is reduced, and wherein said execution unit further includes a carry lookahead circuit having a common bias line and a carry lookahead biasing circuit connected to receive said halt signal and coupled to said common bias line of the carry lookahead circuit for supplying a bias current thereto when said halt signal is inactive and to stop the supply of the bias current when said halt signal is active.

2. A coprocessor system of CMOS structure comprising:

(a) an execution unit, (b) a control unit including:

a bus, an instruction register coupled to said bus to receive and store instructions to be executed, each of which includes an instruction part and information designating a processor which is required to execute said instruction part, said processor designating information being composed of a plurality of most significant bits of said instruction, a first instruction decoder coupled to the instruction register to receive an instruction from the instruction register and to output at least one control signal to the execution unit, a second instruction decoder coupled to said bus for receiving the most significant bits of said instruction for generating a standby cancel signal to said execution unit when said processor designating information designates said coprocessor so that said execution unit is brought into an operating condition in response to said standby cancel signal and executes a predetermined processing in accordance with said one control signal, a microprogram ROM read controller coupled to a microinstruction bus to detect an END microinstruction by detecting a predetermined number of most significant bits of microinstructions and to generate a halt signal in response to said predetermined number of most significant bits of microinstructions and wherein the execution unit is put into a standby mode in response to the halt signal; and a carry lookahead circuit in said execution unit and a carry lookahead biasing circuit which is coupled to a common bias line of the carry lookahead circuit for supplying a bias current to the common bias line of the carry lookahead circuit in response to a standby control signal and to stop the supply of the bias current in response to the halt signal.

3. A microprocessor of CMOS structure comprising:

an execution unit;

a control unit including:

an instruction register receiving and storing instructions to be executed by the microprocessor;

a first instruction decoder receiving an instruction from the instruction register and outputting at least one control signal, a second instruction decoder receiving at least a portion of the instruction applied from the instruction register to the first instruction decoder and supplying a standby control signal to the execution unit, wherein each instruction stored in the instruction register includes a field designating a type of instruction, and wherein the second instruction decoder decodes the field of the instruction and operates to supply the standby control signal to the execution unit to put at least one portion of the execution unit into a standby mode when the field indicates that the given instruction is of a first type, said standby mode being a non-operating condition of said execution unit for reducing an average power consumption of said microprocessor to a level at least one order of magnitude less than an average power consumption of an operating condition of said execution unit, and to inhibit the standby control signal to put the at least one portion of the execution unit into the operating condition when the field indicates that the instruction is of a second type.

4. A microprocessor as claimed in claim 3, wherein the portion of the execution unit put into the standby mode is a microprogram ROM read-out circuit.

5. A microprocessor as claimed in claim 3, wherein the portion of the execution unit put into the standby mode is a carry look-ahead circuit in an arithmetic logic circuit of the execution unit.

6. A microprocessor as claimed in claim 3, wherein the microprocessor is a coprocessor.

7. A microprocessor as claimed in claim 6, wherein the second instruction decoder receives a number of most significant bits of the instruction loaded to the first instruction decoder.

8. A microprocessor as claimed in claim 7, wherein the instruction loaded to the first instruction decoder includes a first portion of most significant bits which indicates whether a given instruction is directed to the coprocessor and a next portion of most significant bits which designates whether the given instruction needs to read a microprogram, and wherein the second instruction decoder includes a first logic circuit receiving the first portion of most significant bits for generating a signal indicating whether said instruction is directed to said coprocessor, a second logic circuit receiving the the next portion of most significant bits for generating a signal for indicating whether said instructions requires a microprogram read and an AND circuit receiving the outputs of the first and second logic circuits for generating a standby cancel signal.

9. A microprocessor as claimed in claim 8 further including a microprogram ROM read controller detection an AND microinstruction by detecting the first portion of most significant bits of microinstructions and generating a halt signal and wherein the execution unit is put into the standby mode in response to the halt signal.

10. A microprocessor as claimed in claim 9 further including a microprogram ROM read-out circuit which is associated to a microprogram ROM, said readout circuit being rendered operational in response to the standby cancel signal and not operational in response to the halt signal.

11. A microprocessor of CMOS structure comprising:
an execution unit;
a control unit including:
an instruction register receiving and storing instructions to be executed by the microprocessor;
a first instruction decoder receiving an instruction from the instruction register and outputting at least one control signal, and
a second instruction decoder receiving at least a portion of the instruction applied from the instruction register to the first instruction decoder and supplying a standby control signal to the execution unit, wherein each instruction stored in the instruction register includes a field designating a type of instruction, and wherein the second instruction decoder decodes the field of the instruction and operates to supply the standby control signal to the execution unit to put at least one portion of the execution unit into a standby mode when the field indicates that the given instruction is of a first type, and to inhibit the standby control signal to put the at least one portion of the execution unit into an operating condition when the field indicates that the instruction is of a second type;

the microprocessor is a coprocessor;

the second instruction decoder receives a number of most significant bits of the instruction loaded to the first instruction decoder; and the instruction loaded to the first instruction decoder includes a first portion of most significant bits which indicates whether a given instruction is directed to the coprocessor and a next portion of most significant bits which designates whether the given instruction needs to read a microprogram and wherein the second instruction decoder includes a first logic circuit receiving the first portion of most significant bits for generating a signal indicating whether said instruction is directed to said coprocessor a second logic circuit receiving the next portion of most significant bits for generating a signal for indicating whether said instructions requires a microprogram read and an AND circuit receiving the outputs of the first and second logic circuits for generating a standby cancel signal; and said microprocessor further includes a microprogram ROM read controller detecting an AND microinstruction by detecting the first portion of most significant bits of microinstructions and generating a halt signal and wherein the execution unit is put into the standby mode in response to the halt signal; and a carry look-ahead circuit in the execution unit and a carry lookahead biasing circuit which is associated with the carry lookahead circuit and adapted to supply a bias voltage to the carry look-ahead circuit in response to the standby cancel signal and to make it non-operational in response to the halt signal.

* * * * *